United States Patent Office 3,531,326
Patented Sept. 29, 1970

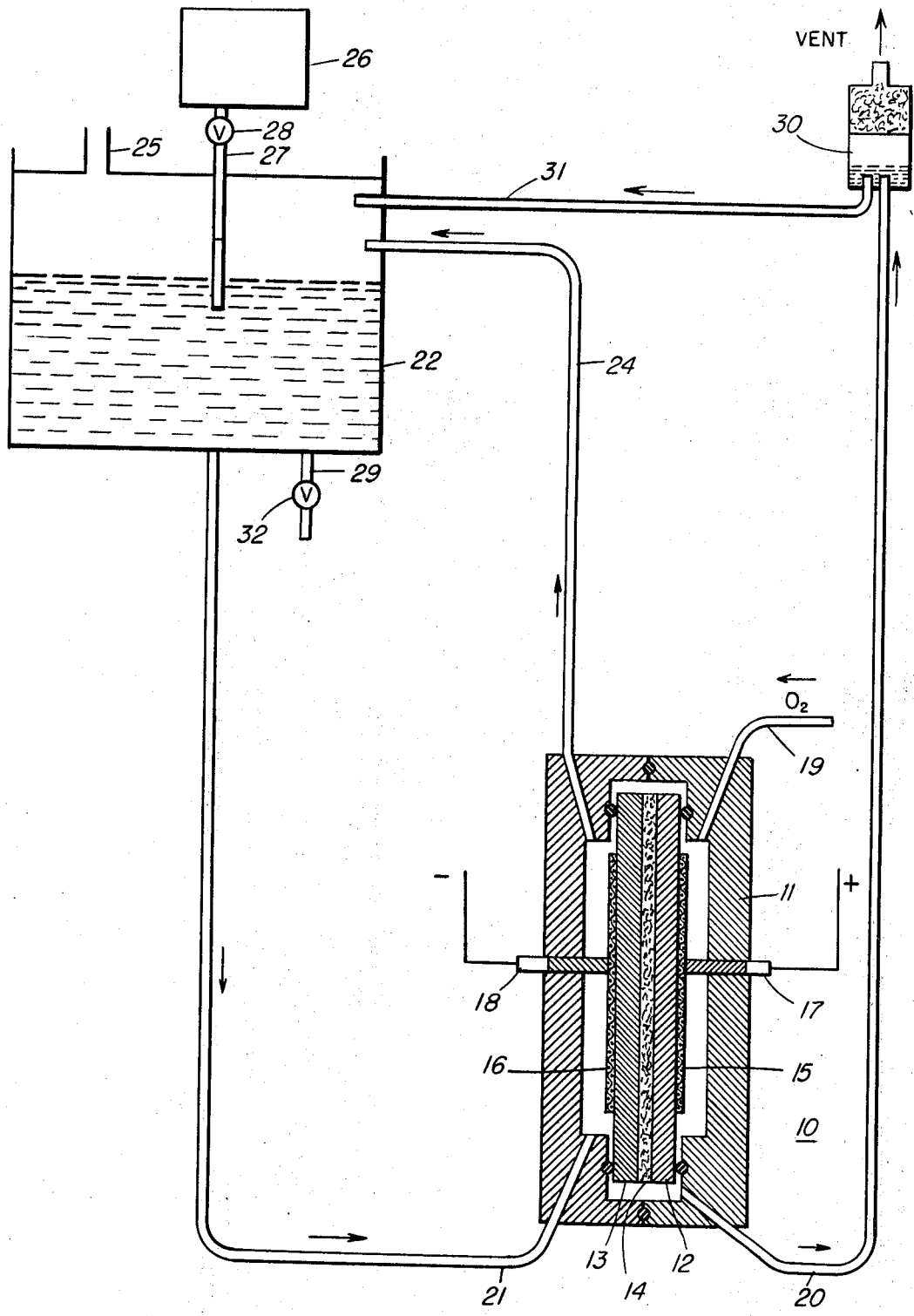

3,531,326
METHOD OF GENERATING ELECTRICITY USING GAS TO RECYCLE LIQUID REACTANT
Anthony J. Stankavich, Syracuse, N.Y., assignor to Carrier Corporation, Carrier Parkway, N.Y., a corporation of Delaware
Filed May 12, 1965, Ser. No. 455,133
Int. Cl. H01m 11/00, 27/00
U.S. Cl. 136—86         6 Claims

ABSTRACT OF THE DISCLOSURE

In a fuel cell utilizing as a reactant liquid fuel dissolved in an aqueous electrolyte, circulation of the reactant liquid to replace spent liquid with fresh liquid is effected without external pumping means by introducing to the liquid exhaust passage the insoluble gaseous product of the reaction to effect a difference apparent density between the fresh and spent liquids to cause gravity circulation.

---

This invention relates to fuel cells. In particular it relates to methods and systems by means of which reactant liquids may be circulated through fuel cells with minimum effort and expenditure of energy.

Fuel cells are electrochemical devices for converting the chemical energy of a fuel directly into electrical energy. In general a fuel cell will comprise an oxidant electrode at which an oxidant, e.g. oxygen or air is brought into contact with an electrolyte and undergoes a chemical reaction, accepting electrons from an external circuit. The cell will also comprise a fuel electrode at which a fuel is brought into contact with the same electrolyte and undergoes a chemical reaction in the course of which it donates electrons to the external circuit. The specific reactions involved may vary widely depending on the nature of the fuel, the oxidant and the electrolyte. In the type of fuel cells here concerned, a reactant liquid, which may be pure fuel or oxidant or fuel or oxidant dispersed or dissolved in a liquid electrolyte, is circulated in contact with the appropriate electrode and at the electrode releases a gas as one of the reaction products. For example in a specific reaction with which the invention is especially concerned, hydrazine in aqueous caustic potash solution is furnished to the fuel electrode of a fuel cell where it reacts to produce nitrogen according to the overall equation

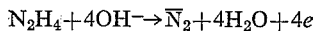

At the cathode or oxidant electrode, oxygen reacts to give hydroxyl ions, according to a reaction which may be represented, in simplified form, as:

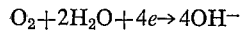

The overall reaction is thus

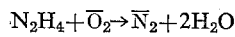

In cells such as this, therefore, a reactant in the liquid phase is continuously consumed and one of the products of the reaction is a gas insoluble in the reactant liquid. It should also be noted that because the reactant is continuously consumed and because the water produced during the reaction dilutes the reactant solution it is necessary to circulate the liquid continuously to maintain constant reaction conditions within the cell. Circulation of liquid also removes heat from the place where it is generated by the electro-chemical reaction.

In prior fuel cell systems using liquid phase reactants, recirculation of the reactants has been by means of a pump. The power required to operate the pump is, of course, a charge on the fuel cell system and decreases its overall efficiency. Moreover, the cost of the pump and the motor required to drive it adds to the initial cost of the system. In addition, the rate at which the reactants must be circulated through the system depends on the electrical demand on the cell and the control devices required to regulate the pump speed in proper response thereto tend to be elaborate and expensive.

It is an object of the present invention to provide a fuel cell system in which a liquid reactant is circulated without using a pump or other externally driven circulating device.

It is another object of the invention to provide a fuel cell system in which a reactant liquid is recirculated through the cell at a rate which is automatically adjusted to conform to demand.

Other objects will become apparent from a consideration of the following specification and claims.

Briefly stated the invention attains these objects by using the gas generated in the fuel cell reaction itself to recirculate reactant liquid.

Thus in one aspect the invention comprises a fuel cell having an electrode, a reservoir for storing reactant liquid, gravity feed means for delivering liquid from the said reservoir to said electrode, and duct means, communicating with said electrode and emptying into said reservoir, whereby gas generated at said electrode recirculates liquid from said electrode to said reservoir.

In another aspect the invention comprises, in a method for generating electricity in which a reactant liquid is caused to react at an electrode surface to produce a gas substantially insoluble in said liquid, the improvement which comprises removing liquid from the electrode by means of the gas produced.

In yet another aspect the invention envisions, in the operation of a fuel cell wherein a reactant-containing liquid undergoes reaction at an electrode with the production of a gaseous reaction product insoluble in the liquid, the improvement which comprises removing a liquid in which at least part of the reactant has been consumed, from the electrode, by means of a gas produced at the electrode.

The invention will be further described with reference to the drawng which shows, partially schematically, and partially in vertical section, a fuel cell system according to the invention.

In the description which follows the invention will be described in connection with a system using oxygen or air as the oxidant, hydrazine dissolved in aqueous KOH as the fuel and aqueous KOH as the electrolyte. It will be understood, however, that the invention is applicable to numerous other fuel cells using different fuels and oxidants.

Referring to the drawing, a fuel cell system according to the invention comprises a fuel cell 10. The structure of the cell itself is not a part of the invention. Particularly suitable structures are described in detail and claimed in the copending applications of Stankavich and Geckle, Ser. Nos. 455,128 and 455,134, filed May 12, 1965.

In general the cell comprises a casing 11 containing a porous metal oxidant electrode 12 and a porous metal fuel electrode 13, separated by a porous, inert electrolyte carrier 14 which may be made of a material such as asbestos and which is saturated with electrolyte.

Current collectors 15 and 16 are pressed against the electrodes 12 and 13 and serve to facilitate the flow of current from the electrodes to terminal posts 17 and 18 which are attached to them.

Oxygen (or air) at a pressure of say 4 p.s.i.g., is fed to the oxidant electrode 12 through a duct 19, and removed, after having passed radially through the porous electrode, through duct 20. Some of the oxygen is, of course, adsorbed or absorbed in the pores of the electrode where is reacts with the electrolyte, accepting electrons from the external circuit (not shown) and forming OH⁻ ions.

Fuel, which in this instance may be a solution of say 3.5% hydrazine in aqueous (30%) KOH, is fed to the fuel electrode 13 through a duct 21. At the fuel electrode 13 it reacts with hydroxyl ions in the electrolyte to give nitrogen and water with donation of electrons to the external circuit. The consumption of hydrazine or other fuel at the fuel electrode requires that the fuel solution be continually recirculated to maintain the proper concentration in contact with the electrode 13. In accordance with the invention this is accomplished by locating a storage zone or a reservoir 22 of fuel solution at a point elevated with respect to the cell 10. Fresh fuel solution is fed from the reservoir 22 through duct 21 which is connected to the bottom of the reservoir, to the cell 10. In accordance with the invention dilute solution is recirculated to the reservoir 22 from the cell 10 through a duct 24 connected to the cell 10 and emptying into the reservoir 22. Liquid is carried from the cell 10 through duct 24, solely by the lift action of the nitrogen generated at the electrode 13, that is, difference in apparent density between column of liquid in duct 21 and column of liquid and nitrogen bubbles in duct 24.

Thus by the present arrangement, the nitrogen produced in the reaction itself, and normally vented to the atmosphere, is used to replace an expensive and energy consuming pump. Moreover, because the rate at which liquor is caused to flow in the novel system is related to the amount of gas produced, and since the latter is a direct function of the electrical demand on the cell, the system is self regulating, the rate of recirculation being increased or decreased in response to an increase or decrease in demand.

The recirculated liquor is, of course, returned from duct 24 at a point in the reservoir 22 above the liquid level.

In a hydrazine-oxygen cell, it is desirable to supply the fuel to the cell at an elevated temperature and for that reason the liquid in reservoir 22 is preferably kept at a suitable operating temperature (60° to 80° C.) by utilization of the waste heat of the reaction or by other suitable means. A certain amount of water is evaporated and is carried off from the reservoir 22 through vent 25, along with the nitrogen emanating from duct 24. Fresh fuel, e.g. hydrazine hydrate, is added to the solution from tank 26 through line 27, controlled by valve 28. Excess liquor may be drained from reservoir 22 through line 29 controlled by valve 32.

A certain amount of electrolyte from the electrolyte carrier 14 will be blown out through the edge of the carrier, and the interface between the oxidant electrode and the electrolyte carrier by the oxygen flowing through the electrode 12. The duct 20 carrying this electrolyte and its entraining gas empties into a trap 30 where liquid is separated and returned to the reservoir 22 through line 31. The gas may be vented as shown in the drawing, or recirculated to the duct 19 by any suitable means.

It has already been pointed out that although the invention has been described with particular reference to a hydrazine-oxygen cell, it is applicable in general to any cell in which a liquid reactant (oxidant or fuel) produces an insoluble gas during its reaction.

Moreover, although the invention has been described, for the sake of simplicity, in connection with a single cell, it is obviously equally applicable to a battery of several cells, and indeed the same reservoir may be used to service a plurality of batteries.

What is claimed is:

1. In a method for generating electricity in which a reactant in the liquid phase is brought into contact with one surface of an electrode and there enters into a chemical reaction with the production of a gas and water, the improvement which comprises delivery of said reactant liquid from a reservoir through a passage to the electrode by gravity and recycling the diluted liquid reactant from the electrode through a second passage to the reservoir by admixing it with the gas generated at the electrode to reduce the apparent density of the admixture below that of the delivered liquid.

2. The method of claim 1 wherein the reactant liquid comprises hydrazine dissolved in an aqueous electrolyte and the reaction produces nitrogen gas and water.

3. The method of claim 2 wherein the aqueous electrolyte is a solution of potassium hydroxide.

4. In the operation of a fuel cell wherein a reactant containing liquid undergoes reaction at an electrode with the production of a gaseous reaction product, the improvement which comprises replenishing the reactant liquid from a reservoir by gravity and recirculating to said reservoir liquid in which at least part of the reactant has been consumed at the electrode by adding to the liquid to be removed the gas produced at the electrode to effect a difference in apparent density between the replenished liquid and the liquid to be removed.

5. In the operatiion of a fuel cell wherein a solution of hydrazine in a liquid electrolyte is brought into contact with an electrode and reacted to form nitrogen and water, the improvement which comprises furnishing fresh hydrazine solution from said reservoir to the electrode by gravity and recirculating dilute solution from the electrode through duct means to the reservoir by the lifting action of the nitrogen produced at the electrode.

6. In the operation of a fuel cell in which a solution of hydrazine in aqueous potassium hydroxide is brought into contact with a fuel electrode and there reacted to form nitrogen and water, the improvement which comprises furnishing hydrazine feed solution from a reservoir to the electrode by gravity and recirculating a solution having a lower hydrazine concentration than the feed solution from the electrode to the reservoir by means of the lifting action of the nitrogen produced at the electrode.

References Cited

UNITED STATES PATENTS

| | | | |
|---|---|---|---|
| 3,350,227 | 10/1967 | Moerikofer et al. | 136—86 |
| 3,143,440 | 8/1964 | Hunger et al. | 136—86 |
| 3,121,031 | 2/1964 | Gruneberg et al. | 136—86 |
| 3,256,163 | 6/1966 | Winsel et al. | 136—86 |

ALLEN B. CURTIS, Primary Examiner

H. A. FEELEY, Assistant Examiner

U.S. Cl. X.R.

136—159

PC-1050
(5/69)

UNITED STATES PATENT OFFICE
CERTIFICATE OF CORRECTION

Patent No. 3,531,326      Dated September 29, 1970

Inventor(s) Anthony J. Stankavich

It is certified that error appears in the above-identified patent and that said Letters Patent are hereby corrected as shown below:

Column 2, line 72, "is" should be --it--

Claim 4, lines 30 and 32, "removed" should be --recirculated--

Claim 5, line 37, "from said reservoir" should be

--from a reservoir--

Claim 4, line 27, "said" should be --the--.

Signed and sealed this 4th day of May 1971.

(SEAL)
Attest:

EDWARD M. FLETCHER, JR.
Attesting Officer

WILLIAM E. SCHUYLER, JR.
Commissioner of Patents